(12) United States Patent
Tatsui

(10) Patent No.: US 9,210,289 B2
(45) Date of Patent: Dec. 8, 2015

(54) IMAGE READING APPARATUS AND MULTIFUNCTIONAL DEVICE

(71) Applicant: SEIKO EPSON CORPORATION, Tokyo (JP)

(72) Inventor: Yoshiaki Tatsui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/959,881

(22) Filed: Aug. 6, 2013

(65) Prior Publication Data
US 2014/0063563 A1    Mar. 6, 2014

(30) Foreign Application Priority Data

Aug. 31, 2012 (JP) ................................. 2012-191453

(51) Int. Cl.
| | |
|---|---|
| *H04N 1/21* | (2006.01) |
| *H04N 1/00* | (2006.01) |
| *H04N 1/32* | (2006.01) |
| *H04N 1/12* | (2006.01) |
| *H04N 1/193* | (2006.01) |

(52) U.S. Cl.
CPC ......... *H04N 1/2108* (2013.01); *H04N 1/00588* (2013.01); *H04N 1/32358* (2013.01); *H04N 1/12* (2013.01); *H04N 1/193* (2013.01); *H04N 2201/0081* (2013.01); *H04N 2201/0094* (2013.01); *H04N 2201/3288* (2013.01)

(58) Field of Classification Search
None
See application file for complete search history.

(56) References Cited

U.S. PATENT DOCUMENTS

| | | | |
|---|---|---|---|
| 4,587,418 A | | 5/1986 | Shirakoshi et al. |
| 5,280,368 A | * | 1/1994 | Fullerton ...................... 358/474 |
| 6,166,394 A | * | 12/2000 | Rubscha .................. 250/559.42 |
| 6,249,359 B1 | * | 6/2001 | Aoki et al. ..................... 358/473 |
| 7,327,501 B2 | | 2/2008 | Chen |
| 2006/0023267 A1 | * | 2/2006 | Ikeno et al. ................... 358/474 |
| 2009/0316233 A1 | * | 12/2009 | Inukai ............................ 358/498 |
| 2010/0142011 A1 | * | 6/2010 | Akahane ........................ 358/498 |
| 2014/0063563 A1 | * | 3/2014 | Tatsui ............................ 358/444 |

FOREIGN PATENT DOCUMENTS

| | | |
|---|---|---|
| JP | 60-004368 A | 1/1985 |
| JP | 07-264360 A | 10/1995 |

* cited by examiner

*Primary Examiner* — Kimberly A Williams
(74) *Attorney, Agent, or Firm* — Global IP Counselors, LLP

(57) ABSTRACT

An image reading apparatus includes an image reading section and a management section. The image reading section has a transport portion configured and arranged to transport a document by driving a motor, a reading portion configured and arranged to read each line of the document which is transported up to a predetermined position by the transport portion, and a holding portion configured and arranged to temporarily hold image data of the document read by the reading portion. The management section is configured and arranged to acquire and store the image data held in the holding portion and to manage the stored image data. The management section is configured and arranged to sequentially acquire and store the data held in the holding portion until driving is finished in a case where the motor starts the driving.

8 Claims, 3 Drawing Sheets

IMAGE READING APPARATUS AND MULTIFUNCTIONAL DEVICE

CROSS-REFERENCE TO RELATED APPLICATIONS

This application claims priority to Japanese Patent Application No. 2012-191453 filed on Aug. 31, 2012. The entire disclosure of Japanese Patent Application No. 2012-191453 is hereby incorporated herein by reference.

BACKGROUND

1. Technical Field

The present invention relates to an image reading apparatus and a multifunctional device.

2. Related Art

A scanner apparatus is a reading apparatus which optically reads text and graphics which are written on a document by scanning and an image, which is obtained from the reflection of a document by illuminating the document, is read using an optical detection means such as a CDD condensing of the light using an optical system as shown in Japanese Unexamined Patent Application Publication No. S60-4368.

In recent years, scanner apparatuses, which are mounted with an automatic document feeder (ADF) apparatus which is driven by a motor, have come into widespread use. It is possible for the scanner apparatuses which are mounted with the ADF to transport and read a plurality of documents which are placed in a tray one at a time without it being necessary for a user to take the time to replace the documents.

After temporarily stopping transport when an end portion of the document which is transported from the tray is optically detected, the scanner apparatus performs skipping transport up to a document reading start position and starts scanning after waiting for the completion of the paper feeding up to the reading start position. Furthermore, the scanner apparatus sequentially writes image data of the document which is obtained by the scanning into the memory of the scanner apparatus and outputs the image data of the plurality of documents to an external apparatus.

SUMMARY

However, in the scanner apparatus described above, in order to write the image data of the reading region from the document reading start position into the memory, it was necessary to match the detection position of the optical detection means and the document reading start position in the skipping transport of the document and it was necessary to control the transport speed in multiple stages using the motor of the ADF.

The present invention has been carried out in order to solve at least a portion of the problems described above, and it is possible for the present invention to be realized as the following formats or application examples.

An image reading apparatus according to one aspect includes an image reading section and a management section. The image reading section has a transport portion configured and arranged to transport a document by driving a motor, a reading portion configured and arranged to read each line of the document which is transported up to a predetermined position by the transport portion, and a holding portion configured and arranged to temporarily hold image data of the document read by the reading portion. The management section is configured and arranged to acquire and store the image data held in the holding portion and to manage the stored image data. The management section is configured and arranged to sequentially acquire and store the data held in the holding portion until driving is finished in a case where the motor starts the driving.

According to such a configuration, since the data which is read by the reading portion up until the driving finishes is all written into a storage unit including the image data of the document in a case where the motor driving for driving the transport portion is started, an operation for changing the feeding speed of the document and aligning the document reading start position with the reading position of the reading portion is not necessary in order to read only the document reading region, and it is possible to simplify the control of the motor.

In the image reading apparatus according to the aspect described above, it is preferable that the image reading section has a function for detecting an end portion of the document which is transported, and the management section is configured and arranged to acquire location information regarding the document image data which is included in the stored data based on information on the end portion of the document detected by the image reading section, to extract the image data from the data based on the location information, and to output the extracted image data.

According to such a configuration, it is possible to extract the image data of the document with good efficiency.

In the image reading apparatus according to the aspect described above, the motor preferably starts the driving based on a reading instruction with regard to the document and finishes the driving in a case where it is not possible for the image reading section to detect the end portion of the document.

Then, a reduction in the size and weight of a printing system is achieved by applying the image reading apparatus described above to a multifunctional device.

BRIEF DESCRIPTION OF THE DRAWINGS

Referring now to the attached drawings which form a part of this original disclosure.

DETAILED DESCRIPTION OF EXEMPLARY EMBODIMENTS

Below, an embodiment of the present invention will be described with reference to the diagrams.

Embodiment

Figure 1:
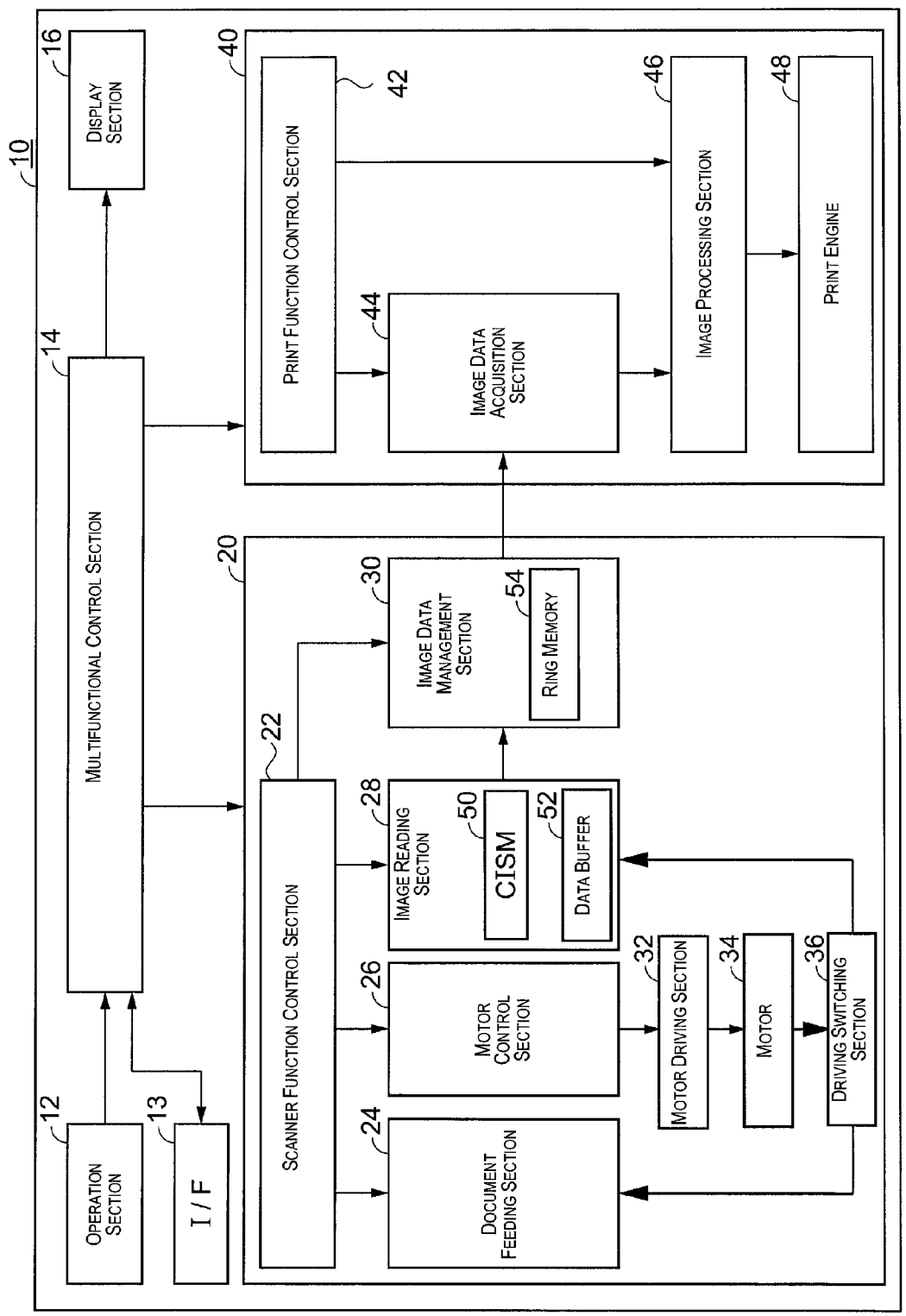
FIG. 1 is a diagram illustrating a configuration of a multifunctional printer according to an embodiment of the present invention.
Figure 2:
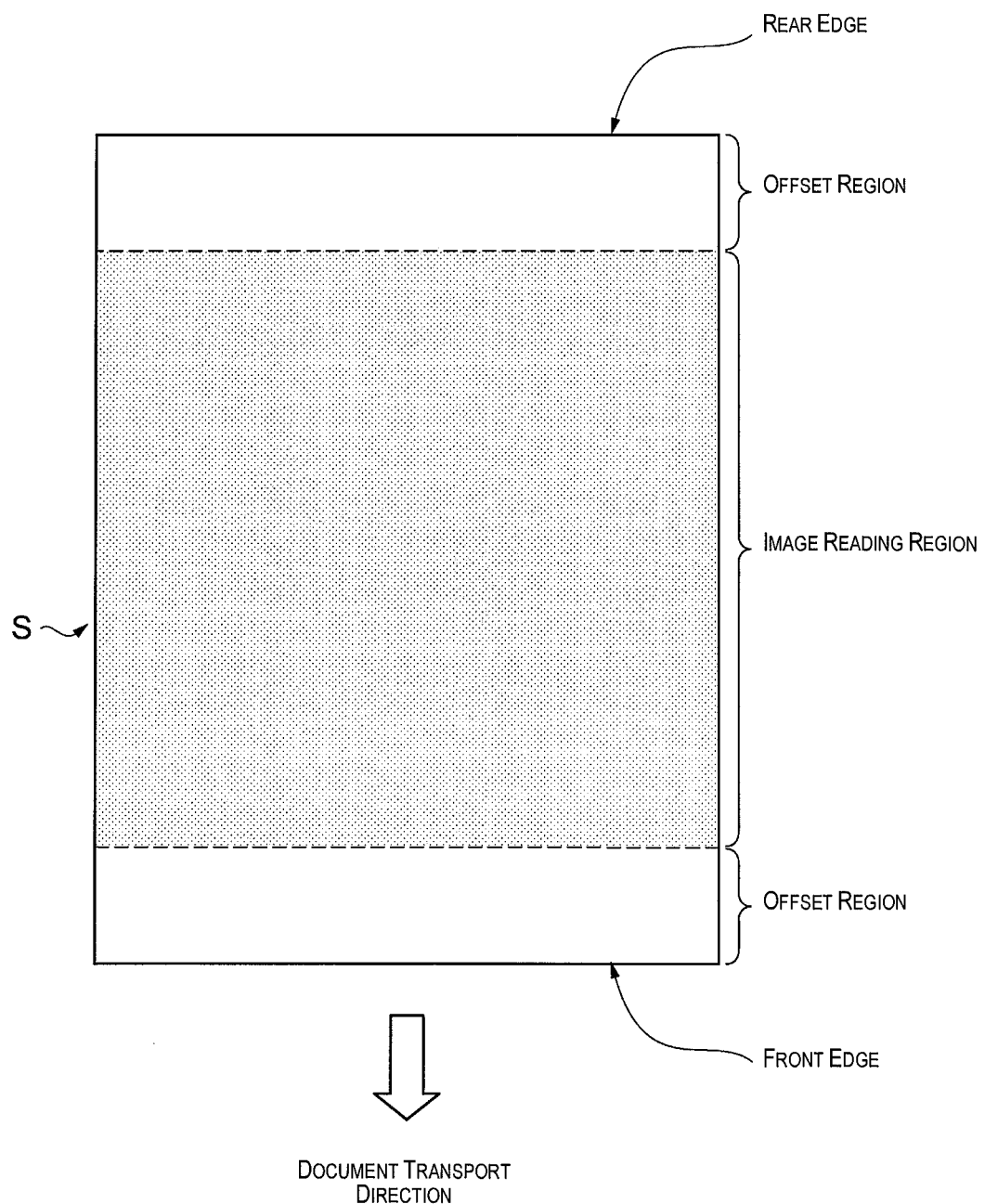
FIG. 2 is a diagram which describes a document with a sheet shape.

FIG. 1 is a configuration diagram illustrating an outline of a configuration of a multifunctional printer 10 which is one example of a multifunctional device. In addition, FIG. 2 is a diagram illustrating a document S with a sheet shape. The multifunctional printer 10 is provided with a multifunctional control section 14, a network interface (I/F) 13, a display section 16, an operation section 12, a scanner unit 20, and a printer unit 40.

The multifunctional control section 14 has a function where the entire apparatus is controlled, and is provided with a CPU, a RAM, a flash memory, and the like which are omitted from the diagram.

Various types of operation signals and various types of detection signals from the scanner unit 20 which functions as the image reading apparatus or the printer unit 40 and operation signals which are generated in accompaniment with the operation of the operation section 12 are input into the multifunctional control section 14. In addition, the multifunctional control section 14 outputs commands to the scanner unit 20 so as to read the document S as image data based on a scanning instruction from the operation section 12 and outputs commands to the printer unit 40 so as to perform printing of the image data.

In the present embodiment, the operation section 12 and the display section 16 are formed integrally as an operation panel. The display section 16 is configured as a touch panel type liquid crystal display and receives touch operations by displaying a mode button which selects a mode, a select/set button which selects a menu or an item, a start button which starts scanning, copying, or printing, and the like as a result of touching according to a guide which is displayed on the display.

It is possible for the scanner unit 20 to select either of a first system where the document S is placed on a glass platform (which is omitted from the diagram) as a flat bed and is read while an imaging element is moved or a second system where, for example, the imaging element is fixed at the end portion of the glass platform or at a position of a reading window which is provided separately to the glass platform and the document S which is moved on the imaging element is read. Here, in the present embodiment, the reading of the document will be described by limiting the description to the format of the second system.

The scanner unit 20 is provided with a scanner function control section 22, a document feeding section 24, a motor control section 26, an image reading section 28, an image data management section 30, a motor driving section 32, a motor 34, and a driving switching section 36. In addition, the image reading section 28 which functions as a reading portion is provided with a contact image sensor module (below, abbreviated as CISM) 50 which reads each line of the document S.

The scanner function control section 22 controls each of the functions of the scanner unit 20. The motor control section 26 instructs driving with regard to the motor driving section 32 based on a motor driving instruction from the scanner function control section 22. In the present embodiment, the motor 34 is assumed to be a step motor, and the motor driving section 32 generates a pulse train based on the driving instruction from the motor control section 26 and rotates the motor 34.

The driving switching section 36 switches and transfers the rotational power of one motor 34 to the image reading section 28 in a case of reading using the first system or to the document feeding section 24 in a case of reading using the second system.

In the present embodiment, the rotational speed of the motor 34 is set to become R1 in a case where the document feeding section 24 transports the document S and the rotational speed of the motor 34 is set to become R2 which is different to R1 in a case where the CISM 50 reads the document S. Here, R2 is determined based on the reading resolution and the reading mode.

Assuming the ADF is a transporting unit, the document feeding section 24 has a function where the rotation of the motor 34 which is transferred from the driving switching section 36 is used to take in the document S which is set in the tray, which is omitted from the diagrams, one sheet at a time and to transport the document S to a predetermined position (a reading position) which faces the CISM 50 along with a function where the document S is sequentially moved to pass through the reading position and the document S which has been read is discharged.

Although both are abbreviated in the diagrams, the CISM 50 is mounted with a light source which irradiates light and contact image sensors which read the document S by receiving reflected light from the document S using a light receiving element and accumulating the received light as an electrical charge. In the present embodiment, the light source has light sources of three colors which are a red LED which emits red light, a green LED which emits green light, and a blue LED which emits blue light, and irradiates light from the light sources to the glass platform.

The contact image sensors are configured so that each single line of a plurality of light receiving elements (for example, a CMOS image sensor) are arranged in the main scanning direction, and generate image data in color (color image data) by reading the reflected light one color at a time while sequentially switching the light of the LEDs of each of the colors. The color image data which is generated for each line is sent to a data buffer 52 (a holding portion) which is provided in the image reading section 28 and held by the data buffer 52. Here, the image data is not limited to color data, and may be monochrome image data.

In addition to separately outputting the electrical charge of each of the light receiving elements, the contact image sensors have a function where the average value of all of the contact image sensors is output. Accordingly, in addition to a document reading process where the image reading region of the document S is read at a predetermined resolution, it is possible for the image reading section 28 to perform an end portion detection process where the end portion of the document S, which is transported by the document feeding section 24, is detected. In a case where the end portion of the document S is detected, for example, detection is possible by monitoring changes in the average value of all of the contact image sensors. In addition, it is even possible to monitor the changes in the individual electrical charges without using the average value of all of the contact image sensors. Here, in a case where a front edge and a rear edge of the document S are detected in the end portion detection process, the image reading section 28 provides notification of the end portion detection to the image data management section 30.

The image data management section 30 is provided with a ring memory 54 as a storage unit, writes the color image data which is held in the data buffer 52 into the ring memory 54 based on an instruction from the scanner function control section 22, and manages the color image data which has been written. The writing into the ring memory 54 is started with the start of the rotation of the motor 34 as a trigger. That is, in a case where the motor control section 26 is instructed to start the driving, the scanner function control section 22 instructs the sequential writing of the color image data which is held in the data buffer 52 also with regard to the image data management section 30. Accordingly, hereafter, the data in the data buffer 52 when the motor 34 is rotating is sequentially written into the ring memory 54 regardless of whether the data is necessary color image data which is read from the reading region of the document or data which is not necessary such as image data which is read from the background of the region which faces the CISM 50 before the document is transported to the reading position or image data which is read from a margin of the document.

In addition, in a case where stopping of the driving is instructed with regard to the motor control section 26 which is driving, the scanner function control section 22 instructs finishing of the sequential writing of the color image data which is held in the data buffer 52 also with regard to the image data management section 30.

In addition, in a case where notification that the image reading section 28 has detected the front edge of the document S is received, the image data management section 30 calculates location information (a start address) of the image reading region except for an offset region (for example, an unnecessary margin region of the document) of the document S which is determined in advance with the front edge as the start, and sets the calculated start address as a read pointer. Here, in the present embodiment, the offset region and the image reading region are determined in advance as fixed values according to the size of the document S.

The image data management section 30 sends the color image data in the ring memory 54 which is indicated by the read pointer with regard to an image data acquisition section 44 of the printer unit 40 based on an instruction from the scanner function control section 22.

Here, according to the settings of the user, instead of sending the color image data to the printer unit 40, the color image data may be stored in a flash memory of the multifunctional printer 10 or may be sent from the I/F 13 to an external apparatus.

The sending of the color image data is repeated until the rear end of the image reading region of the document S, and the color image data of the reading region of the document S is sent with regard to the image data acquisition section 44.

The printer unit 40 is provided with a print function control section 42, an image data acquisition section 44, an image processing section 46, and a print engine 48.

The print function control section 42 controls each of the functions of the printer unit 40. The image data acquisition section 44 acquires the color image data which is sent from the image data management section 30 as image data of the printing target based on an instruction from the print function control section 42. The acquired image data is sent to the image processing section 46. The image processing section 46 carries out image processing with regard to the image data and generates print data which is able to be printed by the print engine 48, and the generated print data is sent to the print engine 48.

The print engine 48 prints an image onto a printing medium by ejecting ink from a print head onto the printing medium based on the print data. Here, in the present embodiment, the print engine 48 is assumed to be an ink jet system but is not limited to this, and it is also possible to use another system such as a laser system.

Figure 3:
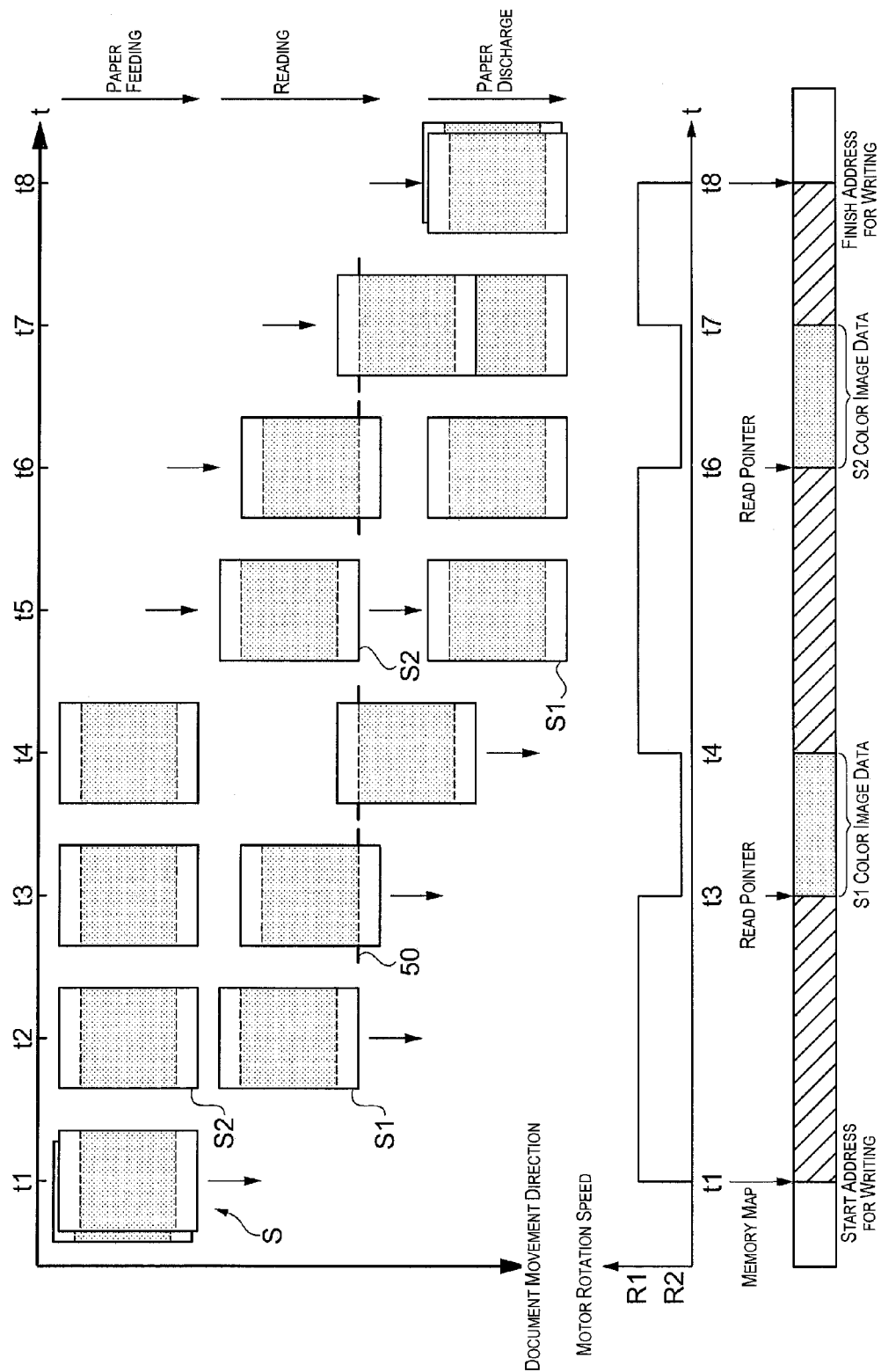
FIG. 3 is a diagram which describes a flow of an image reading process.

Next, an operation of the multifunctional printer 10 of the present embodiment which is configured as described above, in particular, a reading process of the scanner unit 20, will be described with reference to the process flowchart of FIG. 3.

By the user pressing a scanning start button which is displayed on the display panel, the motor 34 starts rotation at the rotation speed R1 and an initial document S1 is extracted from within the documents S which are set in the tray. Furthermore, the CISM 50 starts a reading operation and the image data management section 30 starts a writing process of the data which is held by the data buffer 52 into the ring memory 54 (time t1). Here, at this stage, a background image of the reading position is held in the data buffer 52 since the document has not yet been transported to the reading position, and the writing process from the buffer into the ring memory 54 is continued until there is a finishing instruction.

Subsequently, the extracted initial document S1 is transported toward the reading position (time t2).

When the initial document S1 reaches the reading position, the motor control section 26 changes the rotation speed of the motor 34 from R1 to R2 (time t3). As a result, the document S1 starts moving at a reading speed which corresponds to the rotation speed R2 in one direction on the CISM 50 and the CISM 50 sequentially reads the initial document S1. At this stage, the reading data of the initial document S1 is sent to the data buffer 52 and written into the ring memory 54.

The image data management section 30 calculates the time (or the number of steps of motor driving) to pass through the offset region after the detection of the front edge of the initial document S1 by the CISM 50 and determines the start address of the image reading region based on the calculated time (or the number of steps). Furthermore, the image data management section 30 sets the determined start address at the read pointer and sequentially sends the color image data in the ring memory 54 which is indicated by the read pointer to the printer unit 40.

Subsequently, the scanner function control section 22 calculates the required time (or the required number of steps) until the image reading regions are all read by the CISM 50 from the sending speed of the document S1 which corresponds to R2 and instructs the rotation speed to return to R1 after waiting for the required time (or the required number of steps) to pass (time t4). In addition, the image data management section 30 sends the color image data up until the rear end of the image reading region to the printer unit 40. Upon reception of the color image data, the printer unit 40 starts the printing of the color image data of the initial document S1.

In addition, the initial document S1 moves from the reading position to the discharge position and the next document S2 which is set in the tray is extracted and transported toward the reading position (time t5). However, the transport of the next document S2 may be started in a range where the leading end of the next document S2 does not overlap with the trailing end of the initial document S1 without waiting for the initial document S1 to move to an arrangement position.

When the next document S2 reaches the reading position, the motor control section 26 changes the rotation speed of the motor 34 from R1 to R2 (time t6).

As a result, the CISM 50 reads the document S2 which moves at a sending speed which corresponds to R2, and the image data management section 30 sets the start address of the image reading region in the next document S2 at the read pointer in the same manner as the initial document S1 and sequentially sends the color image data in the ring memory 54 which is indicated by the read pointer to the printer unit 40.

Subsequently, the scanner function control section 22 calculates the required time (or the required number of steps) until the image reading regions are all read by the CISM 50 from the sending speed of the document S2 which corresponds to R2 and instructs the rotation speed to return to R1 after waiting for the required time (or the required number of steps) to pass (time t7). In addition, the image data management section 30 sends the color image data up until the rear end of the image reading region to the printer unit 40. Upon reception of the color image data, the printer unit 40 starts the printing of the color image data of the next document S2.

As a result, the next document S2 starts to move from the reading position to the discharge position. In addition, upon receiving notification that it is not possible for the CISM 50 to detect the front edge of the document S which continues from the next document S2, the scanner function control section 22 determines that there is no document S which is to be read next, stops the rotation of the motor 34, and instructs finishing of the writing process into the ring memory 54 (time t8).

According to the embodiment described above, since the reading of the document S starts along with the start of the rotation of the motor 34 and the reading of the data continues until there are no more of the documents S to be read, the data which includes the image data of the documents S is sequentially written into the ring memory 54. Since the pointer which points to the image data is managed in the ring memory 54, it is possible to easily extract only the image data from the data in the ring memory 54. Accordingly, an operation, where the document S is loaded from the front edge up to the image reading region by being aligned with the reading position of the CISM 50, is not necessary, and speed control of the motor 34 over multiple stages is not necessary.

The embodiment of the present invention has been described with reference to the diagrams but the specific configuration is not limited to the embodiment and design modifications and the like are also included without departing from the gist of the present invention. For example, the memory is not limited to the ring memory 54 and may be a large capacity memory. In this case, the memory stores the data of the document S which has been read by the CISM 50 across all of the document parts, and after all of the document S has been read, the user may specify the image reading region through a user interface.

In addition, in the present embodiment, the multifunctional printer 10 where the scanner unit 20 and the printer unit 40 are integral was assumed, but it is also possible for the present invention to be applied with regard to a scanner apparatus which is provided with only a scanner function.

In addition, an apparatus which executes the method as described above includes various formats with cases of being realized by a single apparatus or cases of being realized by combining a plurality of apparatuses.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image reading apparatus comprising:
   an image reading section having
      a transport portion configured and arranged to transport a document by driving a motor,
      a reading portion configured and arranged to sequentially read a background and the document while the reading portion is positioned at a reading region and the transport portion is transporting the document, the background being an area facing the reading portion positioned at the reading region such that the transport portion transports the document between the reading portion and the background, the background being covered by the document while the document is being transported between the reading portion and the background, the reading portion being configured and arranged to read the background before the document reaches the reading region, and read the document after the document has reached the reading region, and
      a holding portion configured and arranged to temporarily hold image data of the background and the document read by the reading portion; and
      a management section configured and arranged to acquire and store the image data of the background and the document held in the holding portion and to manage the stored image data,
   the reading portion being configured and arranged to continuously read the background and the document during one acquiring operation, in which the management section acquires the image data in succession, until driving of the motor is finished in a case where the motor starts the driving.

2. The image reading apparatus according to claim 1, wherein
   the image reading section has a function for detecting an end portion of the document which is transported, and
   the management section is configured and arranged to acquire location information regarding the image data of the document which is included in the stored data based on information on the end portion of the document detected by the image reading section, to extract the image data of the document from the stored data based on the location information, and to output the extracted image data.

3. The image reading apparatus according to claim 2, wherein
   the motor starts the driving based on a reading instruction with regard to the document and finishes the driving in a case where the image reading section does not detect the end portion of the document.

4. The image reading apparatus according to claim 2, wherein
   the image reading section is configured and arranged to detect a leading front end in a transport direction of the document the transport direction is a direction in which the document is transported toward the reading portion by the transport portion, and
   the management section is configured and arranged to acquire the location information based on information on the leading front end of the document detected by the image reading section.

5. The image reading apparatus according to claim 1, wherein
   the reading portion is configured and arranged to commence reading the background in response to start of the driving of the motor.

6. The image reading apparatus according to claim 5, wherein
the management section is configured and arranged to commence acquiring and storing the image data of the background in response to the start of the driving of the motor.

7. The image reading apparatus according to claim 1, wherein
a rotational speed of the motor is constant for a predetermined period that starts from start of the driving of the motor before a leading end of the document is transported to the reading portion.

8. A multifunctional device comprising:
the image reading apparatus according to claim 2; and
a printing apparatus configured and arranged to acquire the image data of the document which is output from the image reading apparatus and to print an image on a medium based on the acquired image data.

* * * * *